United States Patent
Habermann

(10) Patent No.: US 11,529,728 B2
(45) Date of Patent: Dec. 20, 2022

(54) METHOD FOR CONTROLLING A MOTOR OF A HAND-HELD POWER TOOL

(71) Applicant: Robert Bosch GmbH, Stuttgart (DE)

(72) Inventor: Rudi Habermann, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 322 days.

(21) Appl. No.: 16/625,008

(22) PCT Filed: Jun. 4, 2018

(86) PCT No.: PCT/EP2018/064610
§ 371 (c)(1),
(2) Date: Dec. 20, 2019

(87) PCT Pub. No.: WO2019/001907
PCT Pub. Date: Jan. 3, 2019

(65) Prior Publication Data
US 2020/0139529 A1    May 7, 2020

(30) Foreign Application Priority Data
Jun. 29, 2017   (DE) ..................... 10 2017 211 003.1

(51) Int. Cl.
*B23Q 11/00* (2006.01)
*B25F 5/00* (2006.01)
*H02K 11/28* (2016.01)
*H02P 6/08* (2016.01)

(52) U.S. Cl.
CPC ............ *B25F 5/00* (2013.01); *B23Q 11/0078* (2013.01); *H02K 11/28* (2016.01); *H02P 6/08* (2013.01)

(58) Field of Classification Search
CPC .......................................................... B25F 5/00
USPC ......................................................... 173/4, 15
See application file for complete search history.

(56) References Cited

U.S. PATENT DOCUMENTS

| | | | |
|---|---|---|---|
| 6,741,051 B2 * | 5/2004 | Chu ........................ | H02P 7/29 173/15 |
| 8,403,072 B2 * | 3/2013 | Eshleman ............... | H01H 9/06 173/183 |
| 8,446,120 B2 * | 5/2013 | Forster ................... | H02K 7/145 318/507 |

(Continued)

FOREIGN PATENT DOCUMENTS

| | | |
|---|---|---|
| DE | 38 12 771 A1 | 10/1989 |
| DE | 10 2005 035 046 A1 | 2/2007 |

(Continued)

OTHER PUBLICATIONS

International Search Report corresponding to PCT Application No. PCT/EP2018/064610, dated Oct. 11, 2018 (German and English language document) (8 pages).

*Primary Examiner* — Thanh K Truong
*Assistant Examiner* — Patrick B Fry
(74) *Attorney, Agent, or Firm* — Maginot, Moore & Beck LLP

(57) ABSTRACT

The disclosure relates to a method for controlling a motor of a hand-held power tool by means of a blockable operating element, wherein a first position and a second position of the operating element are ascertained. According to the disclosure, the motor remains deactivated if a deviation of the ascertained first position from the ascertained second position is less than a threshold value.

11 Claims, 4 Drawing Sheets

(56) References Cited

U.S. PATENT DOCUMENTS

| | | | |
|---|---|---|---|
| 8,890,449 B2* | 11/2014 | Suzuki | B25B 21/02 |
| | | | 173/15 |
| 8,988,015 B2* | 3/2015 | Forster | H01R 13/112 |
| | | | 318/599 |
| 9,726,729 B2* | 8/2017 | Chen | G01R 31/343 |
| 10,014,128 B2* | 7/2018 | Kannan | B25F 5/02 |
| 10,293,445 B2* | 5/2019 | Gerstenberger | F16P 3/00 |
| 11,241,778 B2* | 2/2022 | Duesselberg | B25D 17/00 |
| 2013/0249463 A1 | 9/2013 | Nishikimi | |
| 2014/0284070 A1* | 9/2014 | Ng | B25F 5/00 |
| | | | 173/2 |
| 2015/0115857 A1 | 4/2015 | Sergyeyenko et al. | |
| 2015/0170848 A1* | 6/2015 | Kannan | H01H 3/20 |
| | | | 200/43.17 |
| 2016/0046011 A1 | 2/2016 | Ogle et al. | |
| 2017/0072523 A1* | 3/2017 | Gerstenberger | B25F 5/00 |

FOREIGN PATENT DOCUMENTS

| | | |
|---|---|---|
| DE | 10 2011 053 798 A1 | 3/2013 |
| DE | 10 2016 106 395 A1 | 10/2016 |
| DE | 10 2015 012 043 A1 | 3/2017 |
| DE | 10 2015 225 723 A1 | 6/2017 |
| JP | 2003-260675 A | 9/2003 |

* cited by examiner

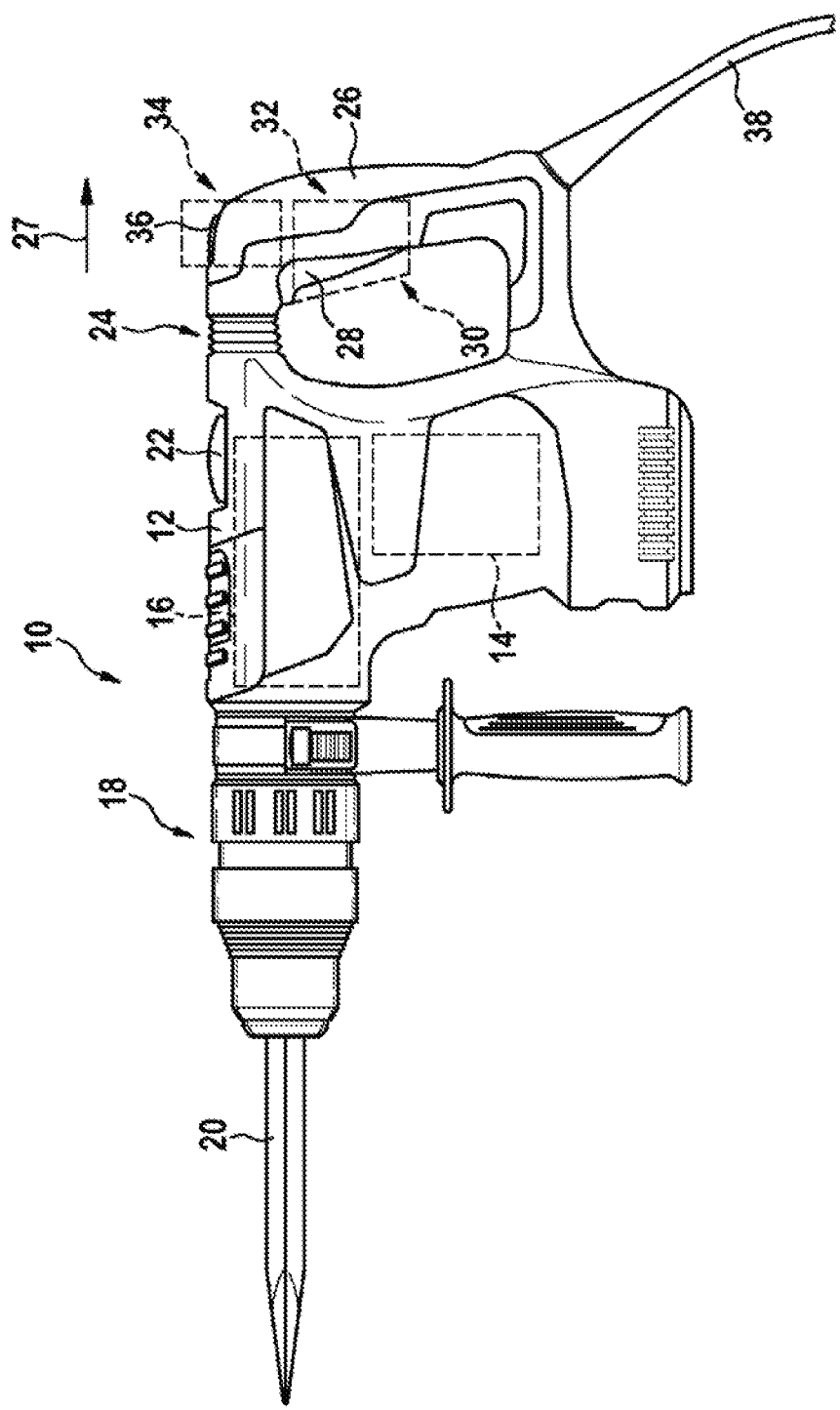

METHOD FOR CONTROLLING A MOTOR OF A HAND-HELD POWER TOOL

This application is a 35 U.S.C. § 371 National Stage Application of PCT/EP2018/064610, filed on Jun. 4, 2018, which claims the benefit of priority to Serial No. DE 10 2017 211 003.1, filed on Jun. 29, 2017 in Germany, the disclosures of which are incorporated herein by reference in their entirety.

BACKGROUND

Hand-held power tools having lockable operator control elements are already known, the electronics system of said hand-held power tools being supplied with electricity as soon as the hand-held power tool is connected to a power source. Immediately after connection to the power source, a microcontroller synchronizes its clock with the mains frequency. If it is ascertained during this time that an operator control element is pressed, a restart protection means which prevents activation of a motor of the hand-held power tool is activated.

SUMMARY

The disclosure relates to a method for controlling a motor of a hand-held power tool having a lockable operator control element, wherein a first position and a second position of the operator control element are ascertained. The disclosure proposes that the motor remains deactivated if a deviation of the ascertained first position from the ascertained second position falls below a threshold value. In this way, the hand-held power tool can advantageously be protected against undesirably restarting when an operator control element is locked.

The hand-held power tool can be designed, by way of example, as a drill, an angle grinder, a jigsaw, a drill etc. The hand-held power tool is preferably designed as a mains-operated hand-held power tool. The operator control element is provided, in particular, to switch on and/or switch off the hand-held power tool. In the context of this application, a lockable operator control element is intended to be understood to mean, in particular, an operator control element of which the position can be locked by means of a mechanical system. The mechanical system can be designed in such a way that locking of the operating element can be performed and released by means of operation of an operating element, which is associated with the mechanical system, by a user. As an alternative, it is also conceivable for the mechanical system to be designed in such a way that locking can be controlled by means of an electrical control signal. Furthermore, it is also conventional for hand-held power tools to be locked by means of a cable tie for simplified handling, this constituting a risk to the safety of the operator. The lockable operator control element is mounted between an inoperative position and an end position such that it can move relative to the housing. The operator control element can be designed in a linearly movable, rotatable or pivotable manner. The operator control element preferably has a resetting unit which is designed to apply a force to the operator control element in the direction of the inoperative position. The operator control element is arranged in the inoperative position in the unoperated and non-locked state. The operator control element can be moved in the direction of the end position by operation of the operator control element using a force. In the pressed state, the operator control element preferably bears against a stop. In particular, the end position and the positions between the inoperative position and the end position can be ascertained. The hand-held power tool preferably has a position-determining unit for the purpose of ascertaining the first and the second position of the operator control element. The position-determining unit can comprise, by way of example, a potentiometer which determines the position of the operator control element by way of a changing resistance. In addition or as an alternative, it is also conceivable for the position-determining unit to comprise an optical detection element which optically detects the position of the operator control element. It is likewise conceivable for the detection unit to comprise a magnetic detection element, such as a Hall sensor for example, which magnetically detects the position of the operator control element. The motor of the hand-held power tool is designed, in particular, as an electric motor. A deactivated motor is intended to be understood to mean, in particular, a motor which is not energized, is switched off and/or is inoperative.

The threshold value may be, by way of example, a minimum distance of the second position from the first position of the operator control element. The minimum distance can be, for example, 20% of the maximum deflection of the operator control element, preferably 10% of the maximum deflection, preferably 5% of the maximum deflection, of the operator control element. As an alternative, it is likewise conceivable for the first position and the second position of the operator control element to always be ascertained at the same location or in the same region and for the threshold value to be formed as a time interval between the measurement points.

Furthermore, the disclosure proposes that at least one further position is ascertained and compared with the first and the second position. The accuracy of the method can advantageously be improved in this way. It is conceivable, based on the ascertained positions of the operator control element, for example, for a straight line or another function, such as a polynomial for example, to be approximated and for the threshold value to be produced from a deviation, in particular a standard deviation, of the approximation. If the approximated function deviates excessively from a prespecified function, the motor remains deactivated.

The disclosure further proposes that initialization of an electronics system is performed before activation of the motor. The electronics system is designed, in particular, to regulate and to control the hand-held power tool. The electronics system comprises a computer unit or a microcontroller for electronic data processing and also preferably further electrical components, such as a printed circuit board, electrical contact elements, a relay, a memory unit, etc. In particular, the position-determining unit is at least partially associated with the electronics system. Initialization of the electronics system, in particular initialization of the computer unit of the electronics system, is performed when energization of the electronics system begins. In this context, initialization is intended to be understood to mean, in particular, a booting process or start-up or starting of a computer program. Data from the memory unit is loaded and characteristic variables of sensor elements are ascertained and tested during the initialization with preference.

The disclosure additionally proposes that the electronics system is not energized in an unoperated state of the operator control element. In particular, initialization of the electronics system is started if the motor is deactivated and the operator control element is moved out of its inoperative position by a threshold value. Initialization is preferably started when ascertaining before the first position of the operator control element. Ascertaining the positions of the operator control element is preferably performed during initialization.

Furthermore, the disclosure proposes that the time interval between the ascertained positions is less than 100 ms, in particular less than 40 ms, preferably less than 10 ms. In particular, the time interval between the first and the second position is shorter than the time for which the initialization process lasts. The time interval between the first and the second position is preferably shorter than the time required for operating the operator control element from its inoperative position to the end position.

The disclosure further proposes that the motor remains deactivated if it is additionally ascertained that the hand-held power tool is not being held. In particular, the hand-held power tool has a motion sensor which is designed to detect a movement of the hand-held power tool. The motion sensor can be designed, by way of example, as an acceleration sensor or as a gyro sensor. If the hand-held power tool is not being held, it can generally be assumed that activation of the motor is not intended. The method can advantageously be further improved by using an additional motion sensor.

In addition, the disclosure relates to a computer program which is designed to carry out a method of the kind described above. Furthermore, the disclosure relates to a machine-readable memory containing the computer program. The disclosure further relates to a hand-held power tool comprising the machine-readable memory.

BRIEF DESCRIPTION OF THE DRAWINGS

Further advantages can be gathered from the following description of the drawings. The drawings and the description contain numerous features in combination. A person skilled in the art will expediently also consider the features individually and combine them to form useful further combinations.

In the drawings:

FIG. 1 shows a side view of a hand-held power tool according to the disclosure;

FIG. 2b shows a further perspective view of the switching apparatus according to FIG. 2a;

DETAILED DESCRIPTION

Figure 2B:
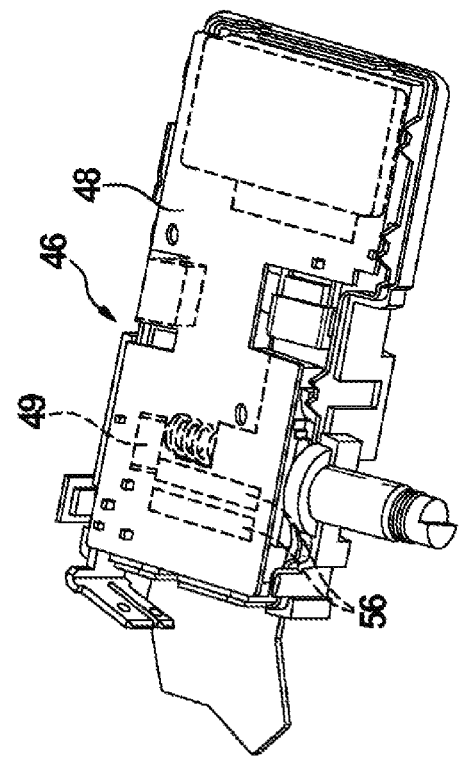

FIG. 1 shows a hand-held power tool 10 according to the disclosure. The hand-held power tool 10 is designed, by way of example, as a mains-operated hammer drill. The hand-held power tool 10 has a housing 12 in which an electric motor 14, a gear mechanism 16 and a tool holder 18 are arranged. An insertion tool 20, which is designed as a chisel by way of example, is detachably fastened in the tool holder 18. The rotational drive movement of the motor 14 is converted into a rotational and/or a linearly oscillating drive movement of the tool holder 18 by means of the gear mechanism 16. The hand-held power tool 10 can be operated in three different operating modes, a drill mode, a hammer drill mode and a chisel mode. The hand-held power tool 10 has an operating mode changeover element 22, which is arranged on the top side of the housing 12 in a rotatable manner, for changing over between the operating modes.

The housing 12 is connected to a handle 26 by means of a vibration-damping unit 24. The handle 26 has an operator control element 28 which is associated with a switching apparatus 30. The motor 14 can be activated and deactivated by means of operation of the operator control element 28 along the operating direction 27. The operator control element 28 is mounted such that it can move relative to the housing 12 and to the handle 26. The operator control element 28 is shown in an inoperative position in which the operator control element is not deflected and the motor is not activated. A force is applied to the operator control element 28 in the direction of the inoperative position by a resetting unit 32. The operator control element 28 can be moved from the inoperative position in the direction of an end position, in which the operator control element is deflected to the maximum extent, by way of operation of the operator control element 28 against a spring force of the resetting unit 32. Furthermore, the hand-held power tool 10 comprises a locking apparatus 34 which is designed to lock the operator control element 28. The locking apparatus 34 is preferably arranged in the region of the switching apparatus 30, in particular on the top side of the handle 26. The locking apparatus 34 comprises a locking element 36 which is designed such that it can be operated by a user. The operator control element 28 of the switching apparatus 30 can be locked in a position which differs from the inoperative position by means of operation of the locking element 36 of the locking apparatus 34. When an operator control element 28 is locked, the motor 14 remains activated, even if the operator control element 28 is no longer being pressed by the user of the hand-held power tool 10.

The hand-held power tool 10 can be connected to an electrical grid by means of a mains cable 38 for the purpose of energy supply. The mains cable 38 is arranged on the bottom side of the handle 26.

Figure 2A:
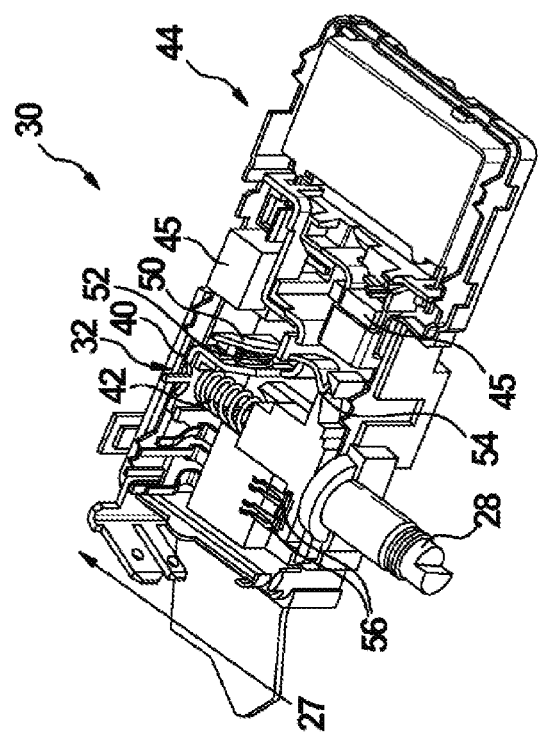
FIG. 2a shows a perspective view of a switching apparatus of the hand-held power tool.

FIG. 2a and FIG. 2b show a perspective view of the switching apparatus 30 in the unoperated state. The switching apparatus 30 has a switching housing 40 in which the operator control element 28 is guided in a linearly movable manner. The resetting unit 32 has a spring element 42 which is arranged between the switching housing 40 and the operator control element 28. The switching apparatus 30 comprises an energy supply unit 44 which is electrically connected to the mains cable 38. The energy supply unit 44 has two electrical contact elements 45. The energy supply unit 44 is designed, in particular, to supply energy to an electronics system 46 (see FIG. 2b). The electronics system 46 is arranged in the switching housing 40 of the switching apparatus 30 and comprises a printed circuit board 48 and a computer unit 49. The electronics system 46 is designed such that it can be electrically connected to the energy supply unit 44 by means of a switching element 50. The switching element 50 is mounted in the switching housing 40 in a pivotable manner. The switching element 50 bears, at one end, against a stop region 54 of the operator control element 28. A further spring element 52 bears against the switching element 50 at the other end of the switching element 50. When the operator control element 28 is operated along the operating direction 27, the stop region 54 is moved past the switching element 50 in such a way that, on account of the spring force of the spring element 52, the switching element 50 carries out a pivoting movement and electrically connects the electronics system 46 to the energy supply unit 44.

If the electronics system 46 is connected to the energy supply unit 44 in the operated state of the operator control element 28, the electronics system 46 is firstly initialized.

The computer unit 49 is started up during initialization. Initialization lasts for approximately 100 ms and no activation of the motor 14 takes place during this time period. After initialization, the motor 14 can be activated by means of the electronics system 46. Furthermore, the switching apparatus 30 has a position-determining unit 56 which is designed as a potentiometer. The position of the operator control element 28 can be ascertained by means of the position-determining unit 56 by way of a change in resistance.

Figure 3:
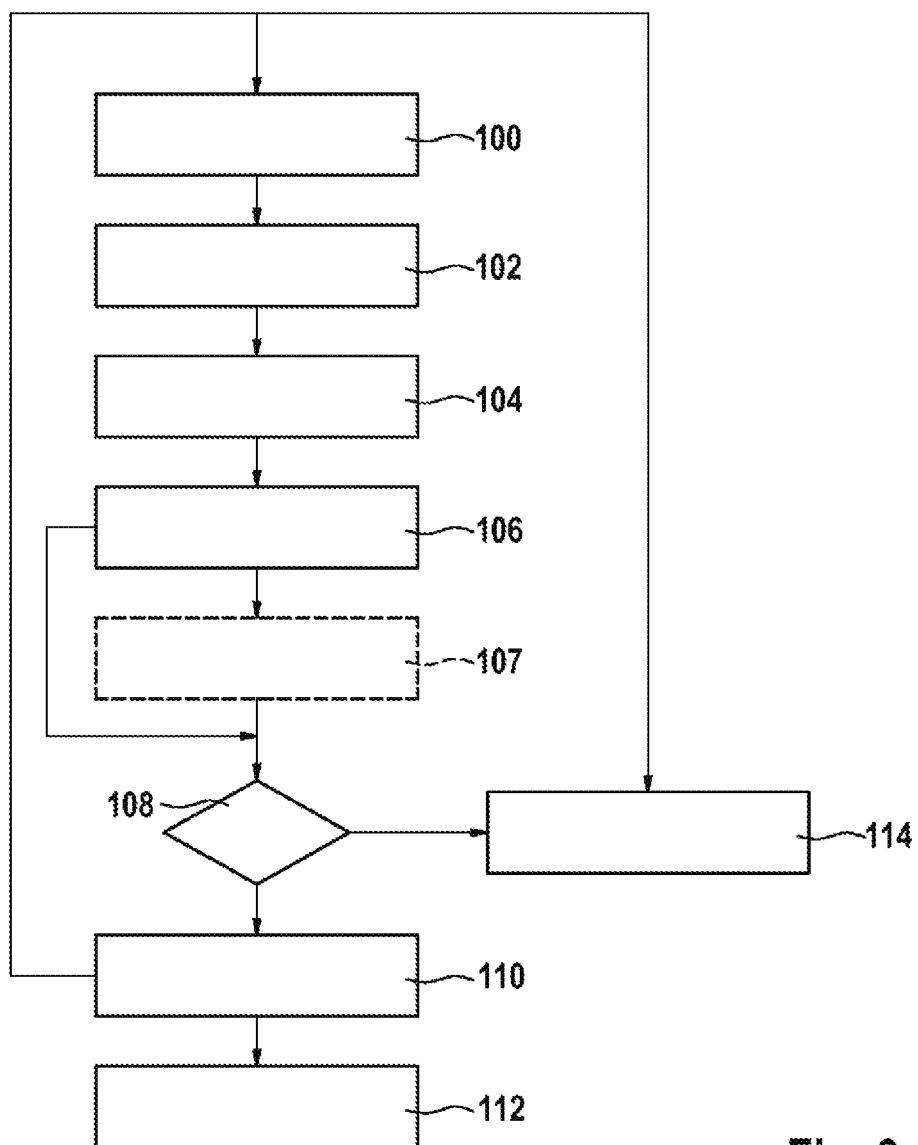
FIG. 3 shows an illustration of a flowchart for a method for controlling the hand-held power tool.

FIG. 3 depicts a flowchart of a method according to the disclosure for controlling the motor 14 of the hand-held power tool 10. In a first step 100, operation of the operator control element 28 takes place. The operator control element is moved in such a way that the switching element 50 no longer bears against the stop region 54 of the operator control element 28 and pivots in such a way that the electronics system 46 is electrically connected to the energy supply unit 44. If the energy supply unit 44 is connected to the electrical grid by means of the mains cable 38, initialization of the electronics system 46 is started in step 102. Initialization lasts for 100 ms by way of example. In a further step 104, a position of the operator control element 28 is ascertained by means of the position-determining unit 56. Ascertaining the first position of the operator control element 28 can start at the beginning of initialization or after a short time. In the following step 106, a second position of the operator control element 28 is ascertained by means of the position-determining unit 56 with a time interval. In addition, it is conceivable for at least one further position to be ascertained in another at least one further step 107. The time interval is, by way of example, 10 ms. In particular, all the positions of the operator control element 28 are ascertained during initialization. In a comparison step 108, a comparison is made in respect of whether a deviation of the ascertained first position from the ascertained second position falls below a threshold value. If yet further positions have been ascertained, these can also be compared in an analogous manner. If the deviation does not fall below a threshold value, the motor 14 is activated in a step 110 after the end of initialization and the hand-held power tool 10 is switched on. If the operator control element 28 is released, or after operation of the operator control element 28, the electronics system 46 is isolated from the energy supply unit 44 in a step 112 and the motor 14 is deactivated.

If the deviation falls below a threshold value, the motor 14 remains deactivated in a step 114. As an alternative or in addition, initialization can be interrupted during step 114. Activation of the motor 14 is possible only by way of renewed operation of the operator control element 28.

Figure 4:
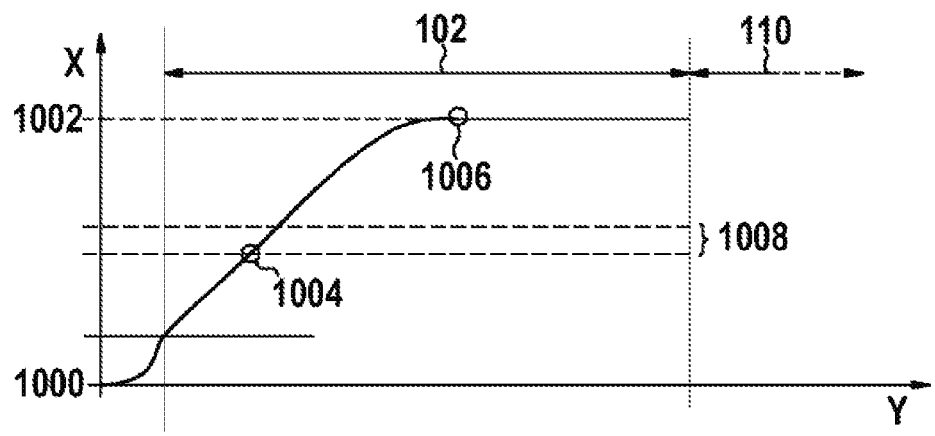
FIG. 4 shows a schematic course of the method.

FIG. 4 shows a travel/time graph which shows the transition of the motor 14 from the deactivated state to the activated state. The deflection of the operator control element 28 along the operating direction 27 is illustrated on the x-axis, wherein the deflection is zero in the inoperative position 1000 and is at a maximum in the end position 1002. The time is plotted on the y-axis. Operation of the operator control element 28 begins at the origin. After approximately 10 ms, the switching element 50 was moved in such a way that the electronics system 46 is energized and initialization begins. The initialization process lasts for 100 ms by way of example. The operator control element 28 is moved to its end position 1002 within the first 40 ms. Deflection of the operator control element 28 takes place in a constantly increasing manner by way of example. Other deflection behaviors, such as in a linearly increasing manner for example, are also conceivable depending on the type of operator control element and pressing behavior of the user of the hand-held power tool 10. A first position 1004 and a second position 1006 of the operator control element 28 are ascertained by means of the position-determining unit 56, wherein the second position 1006 is, by way of example, the end position 1002. A comparison is made in respect of whether the deviation of the ascertained positions 1004, 1006 falls below a threshold value 1008. The threshold value 1008 is formed, by way of example, as 10% of the maximum deflection or as 10% of the end position 1002. The threshold value 1008 is marked, by way of example, as a dashed line at a distance of 10% of the end position 1002 above the first position 1004. Since the deviation of the second position 1006 from the first position 1004 is greater than the threshold value 1008, the hand-held power tool 10, in particular the motor 14, is activated after the end of initialization. In particular, the distance of the second position 1006 from the first position 1004 is greater than the distance of the threshold value 1008 from the first position 1004. The same applies when considering the threshold value 1008 around the second position 1006 or possibly further positions.

Figure 5:
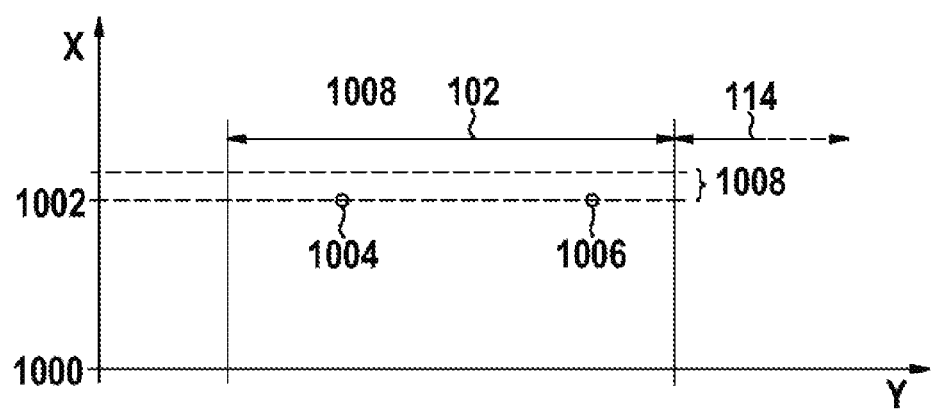
FIG. 5 shows a further schematic course of the method.

FIG. 5 shows a travel/time graph which shows the motor 14 remaining in the deactivated state. At the origin, the operator control element 28 is locked in its end position 1002 by means of the locking apparatus 34 and the mains cable 38 is not connected to a power source. After 20 ms, the mains cable 38 is connected to the power source and initialization is started. Since the operator control element 28 is locked, there is no change in the deflection of the operator control element 28. The first ascertained position 1004 and the second ascertained position 1006 both correspond to the end position 1002 of the operator control element 28. Since the deviation of the two positions falls below the threshold value 1008, or since the two ascertained positions are the same on account of locking, the hand-held power tool 10, in particular the motor 14, is not activated after initialization. This can advantageously prevent the hand-held power tool 10 with the locked operator control element 28 being activated as soon as an energy source is connected.

The invention claimed is:

1. A method for controlling a motor of a hand-held power tool having a lockable operator control element, the method comprising:
   initializing an electronics system in response to the lockable operator control element being moved from an inoperative position;
   ascertaining (i) a first position of the lockable operator control element at a first time after the initialization of the electronic system has begun and (ii) a second position of the lockable operator control element at a second time after the initialization of the electronic system has begun, the second time being subsequent to the first time by a predetermine time interval; and
   activating the motor after the initialization of the electronic system in response to a deviation of the ascertained second position from the ascertained first position being at least a threshold value, wherein the motor remains deactivated in response to the deviation falling below the threshold value.

2. The method as claimed in claim 1, further comprising:
   ascertaining at least one third position of the lockable operator control element; and
   comparing the at least one third position with the first position and with the second position.

3. The method as claimed in claim 1, wherein the electronics system is not energized while the lockable operator control element is at the inoperative position.

4. The method as claimed in claim 1, the initializing further comprising:
   initializing the electronics system in response to (i) the motor being deactivated and (ii) the lockable operator control element being moved out of the inoperative position of the lockable operator control element by a threshold value.

5. The method as claimed in claim 1, the ascertaining further comprising:
   ascertaining the first position and the second position of the lockable operator control element during the initialization of the electronic system.

6. The method as claimed in claim 1, wherein the time interval is less than 100 ms.

7. The method as claimed in claim 6, wherein the time interval is less than 40 ms.

8. The method as claimed in claim 7, wherein the time interval is less than 10 ms.

9. The method as claimed in claim 1, further comprising:
   ascertaining that the hand-held power tool is not being held,
   wherein the motor remains deactivated in response to the ascertaining that the hand-held power tool is not being held.

10. A non-transitory machine-readable memory that stores a computer program for controlling a motor of a hand-held power tool having a lockable operator control element, the computer program being configured to, when executed by a computer, cause the computer to:
   initialize an electronics system in response to the lockable operator control element being moved from an inoperative position;
   ascertain (i) a first position of the lockable operator control element at a first time after the initialization of the electronic system has begun and (ii) a second position of the lockable operator control element at a second time after the initialization of the electronic system has begun, the second time being subsequent to the first time by a predetermine time interval; and
   activate the motor after the initialization of the electronic system in response to a deviation of the ascertained second position from the ascertained first position being at least a threshold value, wherein the motor remains deactivated in response to the deviation falling below the threshold value.

11. A hand-held power tool comprising:
   a motor;
   an electronics system
   a lockable operator control element; and
   a non-transitory machine-readable memory that stores a computer program for controlling the motor, the computer program being configured to, when executed, cause the hand-held power to:
      initialize the electronics system in response to the lockable operator control element being moved from an inoperative position;
      ascertain (i) a first position of the lockable operator control element at a first time after the initialization of the electronic system has begun and (ii) a second position of the lockable operator control element at a second time after the initialization of the electronic system has begun, the second time being subsequent to the first time by a predetermine time interval; and
      activate the motor after the initialization of the electronic system in response to a deviation of the ascertained second position from the ascertained first position being at least a threshold value, wherein the motor remains deactivated in response to the deviation falling below the threshold value.

* * * * *